UNITED STATES PATENT OFFICE.

HENRY WITTICH, OF BALTIMORE, MARYLAND.

IMPROVEMENT IN THE MANUFACTURE OF VINEGAR.

Specification forming part of Letters Patent No. 43,148, dated June 14, 1864.

*To all whom it may concern:*

Be it known that I, HENRY WITTICH, of the city and county of Baltimore, and State of Maryland, have invented certain new and useful Improvements in the Manufacture of Vinegar; and I do hereby declare that the following is a full, clear, and exact description of my said process.

In the manufacture of vinegar by the quick process alcoholic liquor mixed with water and vinegar is used as the liquid, which, when brought in contact with the atmospheric air, is converted into vinegar.

My invention consists in dispensing with the use of alcoholic liquor in the above liquid, and by substituting therefor starch, which, being converted into sugar and dissolved in water, is converted into vinous liquor, which is acidified in the same manner as alcoholic liquor, thus saving the cost of using distilled alcoholic liquor.

To enable others skilled in the art to use my invention, I will proceed to describe its operation.

The starch is mixed in water and boiled by steam to a temperature of about 180° Fahrenheit, when starch-gum is formed, and by continuing the boiling and by adding a small quantity of malt or sulphuric acid the starch is converted into sugar, and the excess of sulphuric acid is neutralized by adding chalk or lime. This done, the process of vinous fermentation is started by adding a small quantity of yeast, and the vinous liquor thus obtained is used without any further treatment in the manufacture of vinegar by the quick process in the same manner as the liquid containing alcoholic liquor has been used heretofore.

The cheapness of this process is self-evident, as the entire process of distillation is saved.

The vinous liquor above described does not contain impurities, which tend to clog the vinegar-vats, such as is the case where malt is used in large quantities, and the vinegar produced is fully as good as that obtained by the old process, and it can be manufactured at a great saving.

Having thus fully described the nature of my invention, what I claim herein as new, and desire to secure by Letters Patent, is—

The application of starch to the liquor used in the manufacture of vinegar as a substitute for alcoholic liquor, when used substantially in the manner and for the purposes herein described.

HENRY WITTICH.

Witnesses:
F. GARDNER,
JOHN FRIEDERICH.